P. R. C. LAWRENZ.
VALVE GEAR FOR COMBUSTION ENGINES.
APPLICATION FILED AUG. 3, 1911.
1,076,294.
Patented Oct. 21, 1913.
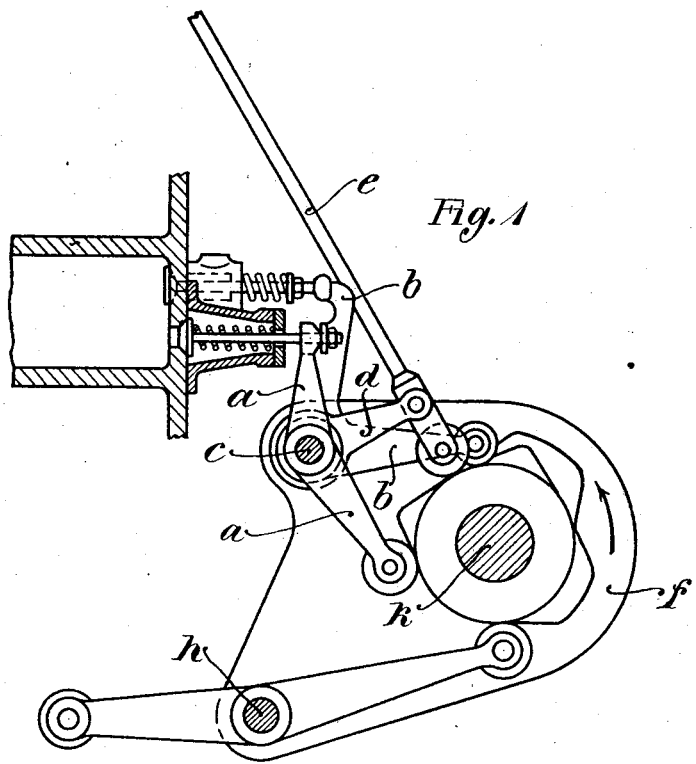
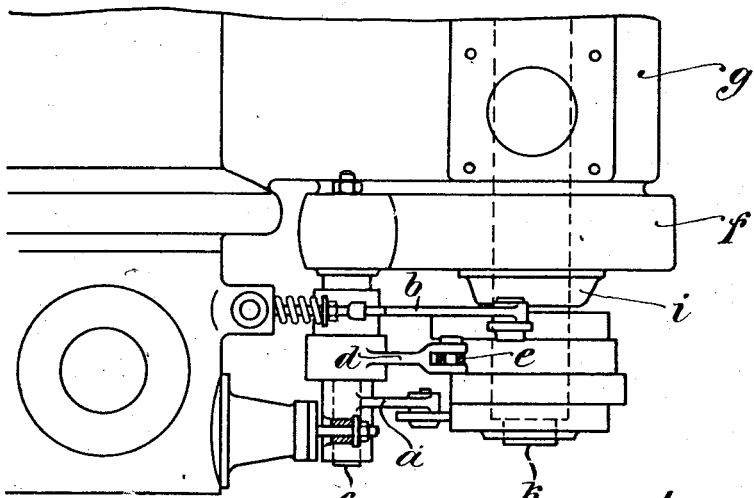
Witnesses:
John C. Sanders
John A. Percival
Inventor
Paul Robert Carl Lawrenz
BY ___ McLean ___
Attorney.

UNITED STATES PATENT OFFICE.

PAUL ROBERT CARL LAWRENZ, OF COLOGNE, GERMANY.

VALVE-GEAR FOR COMBUSTION-ENGINES.

1,076,294.  Specification of Letters Patent.  Patented Oct. 21, 1913.

Application filed August 3, 1911. Serial No. 642,174.

*To all whom it may concern:*

Be it known that I, PAUL ROBERT CARL LAWRENZ, a subject of the Emperor of Germany, residing at 1 Kunibertskloster, Cologne-on-the-Rhine, Germany, have invented certain new and useful Improvements in Valve-Gears for Combustion-Engines, of which the following is a specification.

This invention relates to valve gears for combustion engines and its chief object is to provide a valve gear of simple construction and arrangement.

The accompanying drawing shows in Figure 1 an elevational view of the subject matter of the invention and a partial sectional view of the head of the cylinder. Fig. 2 represents a plan view of the new device.

The combustion engine, one end of which is illustrated in the drawing, is provided with a controlling shaft $k$ adapted to be rotated by the main shaft of the engine (not illustrated) in the known manner at half the speed of the latter. The free end of the controlling shaft $k$ penetrates a bearing plate $f$ (see Fig. 2) and is positioned within the bearing plate in a bearing $i$. The end of the controlling shaft projecting beyond this bearing $i$ carries a plurality of cam plates arranged closely one behind the other and packed tightly in a suitable manner in order to serve for the movement of the individual valves.

The bearing plate $f$ is screwed to a bracket-arm $g$ of the cylinder and carries two pins $c$ and $h$. Movably mounted on the pin $c$ is a lever $a$ the end of which is adjusted in a downwardly direction and carries a roller running upon one of the aforesaid cam-plates of the end of the controlling shaft, and the upper free end of the lever $a$ engages the valve regulating the feed of the fuel to the combustion chamber of the engine. In addition to the lever $a$ a crank arm $d$ is also movably mounted upon the pin $c$ and is provided with fork-shaped ends which engage a rod $e$. This rod $e$ carries at its lower end a roller running upon one of the aforesaid cam plates and leading to the valve (not illustrated in the drawing) permitting the admission into the cylinder of the fuel to be drawn into the engine. A bell-crank lever $b$ also movably mounted upon pin $c$ is adapted to rest upon one of the cam plates one end of the lever being provided with rollers, the other end of the said bell-crank lever being adapted to operate a valve serving for the admission of the compressed air into the chamber of the cylinder.

The pin $h$ mounted upon the bearing plate $f$ carries a double armed lever adapted to be turned, and this lever controls the outlet valve of the engine and is actuated also by means of one of the aforesaid cam plates.

The cams of the cam plates are as shown in Fig. 1, arranged relatively at certain predetermined angles. The different rollers also come into engagement at different times with the different points of the circumferences of the cams. These relative adjustments of the rollers and the cams are selected in such manner that, upon the rotation of the controlling shaft in the direction indicated by the arrow, the different valves are successively and properly closed for the time being and for the length of time required for the operation of the engine.

The essential feature of the present invention consists in the fact that all the bearing points for the operation of the different controlling members are mounted upon a single bearing plate of the controlling shaft, so that these controlling members are adapted to be accurately centered toward the center of the controlling shaft.

Even if the operation of the engine is contemplated in accordance with some other arrangement, *i. e.*, by means of some other valve-gears these new valve gears may be easily placed in position by exchanging the bearing plate without requiring any changes to be made in any other parts of the engine.

What I claim and desire to secure by Letters Patent is:—

1. A valve gear for combustion engines comprising a pin, a lever for controlling the fuel valve, a lever for controlling the starting valve, a rod for controlling the inlet valve, a crank having one end connected to said rod, said levers and said crank being mounted on said pin, and means for operating said levers and said rod.

2. A valve gear for combustion engines comprising a pin, a lever for controlling the fuel valve, a lever for controlling the starting valve, a rod for controlling the inlet valve, a crank having one end connected to said rod, said levers and said crank being mounted on said pin, and a cam shaft for operating said levers and said rod.

3. A valve gear for combustion engicomprising a supporting plate, a pin mounted on said supporting plate, a lever for controlling the fuel valve, a lever for controlling the starting valve, a rod for controlling the inlet valve, a crank having one end connected to said rod, said levers and said crank being mounted on said pin, and means for operating said levers and said rod.

4. A valve gear for combustion engines comprising a supporting plate, a pin mounted on said supporting plate, a lever for controlling the fuel valve, a lever for controlling the starting valve, a rod for controlling the inlet valve, a crank having one end connected to said rod, said levers and said crank being mounted on said pin, and a cam shaft journaled in said supporting plate for operating said levers and said rod.

5. A valve gear for combustion engines comprising a supporting plate adapted to be removably attached to a bracket on the cylinder of the engine, a pin mounted on said supporting plate, a lever for controlling the fuel valve, a lever for controlling the starting valve, a rod for controlling the inlet valve, a crank having one end connected to said rod, said levers and said crank being mounted on said pin, and means for operating said levers and said rod.

6. A valve gear for combustion engines comprising a supporting plate adapted to be removably attached to a bracket on the cylinder of the engine, a pin mounted on said supporting plate, a lever for controlling the fuel valve, a lever for controlling the starting valve, a rod for controlling the inlet valve, a crank having one end connected to said rod, said levers and said crank being mounted on said pin, and a cam shaft journaled in said supporting plate for operating said levers and said rod.

In testimony whereof I affix my signature in presence of two witnesses.

PAUL ROBERT CARL LAWRENZ.

Witnesses:
　OSCAR DEPNER,
　LOUIS VANDORN.